(12) United States Patent
Cominsky et al.

(10) Patent No.: US 11,136,107 B2
(45) Date of Patent: Oct. 5, 2021

(54) METHOD AND APPARATUS FOR ATTACHING A FUSELAGE FRAME TO A WING BOX

(71) Applicant: The Boeing Company, Chicago, IL (US)

(72) Inventors: Kenneth D. Cominsky, Mukilteo, WA (US); Brent Edward Beneke, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 550 days.

(21) Appl. No.: 16/152,788

(22) Filed: Oct. 5, 2018

(65) Prior Publication Data
US 2020/0108908 A1    Apr. 9, 2020

(51) Int. Cl.
*B64C 1/26*    (2006.01)
*B64F 5/10*    (2017.01)

(52) U.S. Cl.
CPC . *B64C 1/26* (2013.01); *B64F 5/10* (2017.01)

(58) Field of Classification Search
CPC ..................................... B64C 1/26; B64F 5/10
See application file for complete search history.

(56) References Cited

U.S. PATENT DOCUMENTS

| | | | |
|---|---|---|---|
| 6,808,143 B2 | 10/2004 | Munk et al. | |
| 8,746,621 B2* | 6/2014 | Cabanac | B64C 1/26 244/131 |
| 8,857,765 B2* | 10/2014 | Thomas | B64C 1/26 244/119 |
| 8,991,762 B2* | 3/2015 | Voss | B64C 1/26 244/131 |
| 9,180,956 B1 | 11/2015 | Thomas et al. | |
| 2008/0283666 A1 | 11/2008 | Grieve et al. | |
| 2009/0146007 A1 | 6/2009 | Keeler, Jr. et al. | |
| 2010/0200691 A1 | 8/2010 | Gallant | |
| 2011/0147521 A1 | 6/2011 | Delahaye et al. | |
| 2011/0266398 A1* | 11/2011 | Voss | B64C 1/26 244/45 R |
| 2012/0193475 A1* | 8/2012 | Cabanac | B64C 1/26 244/131 |
| 2013/0062467 A1 | 3/2013 | Soenarjo | |

(Continued)

FOREIGN PATENT DOCUMENTS

RU    2613551 C1    3/2017

OTHER PUBLICATIONS

European Search Report regarding European Patent Application No. 19186565.8 dated Jan. 7, 2020; pp. 1-10.

*Primary Examiner* — Philip J Bonzell
(74) *Attorney, Agent, or Firm* — Armstrong Teasdale LLP (57) ABSTRACT

An aircraft includes an aircraft body including a longitudinal axis and a wing box extending through the aircraft body. The aircraft also includes an attachment assembly coupled to the aircraft body and to the wing box. The attachment assembly includes a first attachment member coupled to the aircraft body and a second attachment member coupled to the wing box. The second attachment member is configured to couple to the first attachment member. The attachment assembly also includes a plurality of fasteners extending through the first attachment member and the second attachment member such that the plurality of fasteners are loaded in shear during a wing loading condition.

20 Claims, 6 Drawing Sheets

(56) References Cited

U.S. PATENT DOCUMENTS

| | | |
|---|---|---|
| 2014/0013162 A1 | 1/2014 | Mishima |
| 2014/0103162 A1* | 4/2014 | Thomas .................... B64C 1/26 244/119 |
| 2017/0015402 A1 | 1/2017 | Lakic et al. |
| 2020/0189713 A1* | 6/2020 | Murphy .................... B64C 3/00 |
| 2020/0189714 A1* | 6/2020 | Murphy .................... B64F 5/10 |

* cited by examiner

METHOD AND APPARATUS FOR ATTACHING A FUSELAGE FRAME TO A WING BOX

FIELD

The following disclosure relates generally to aircraft structures and, more particularly, to aircraft wing-to-body attachments.

BACKGROUND

A significant portion of aircraft final assembly time is spent in joining the wing assembly to the aircraft body. One known wing-to-body installation method includes attaching the wing assemblies to the aircraft using multiple attachment assemblies. The attachment assemblies are connected to each other with a plurality of fasteners. During certain loading conditions of the wings, the load path is channeled through the fasteners such that the fasteners are loaded in tension. In order to safely carry the tensile loads, the fasteners are relatively large and increase the weight of each attachment assembly.

BRIEF DESCRIPTION

In one aspect, an aircraft is provided. The aircraft includes an aircraft body including a longitudinal axis and a wing box extending through the aircraft body. The aircraft also includes an attachment assembly coupled to the aircraft body and to the wing box. The attachment assembly includes a first attachment member coupled to the aircraft body and a second attachment member coupled to the wing box. The second attachment member is configured to couple to the first attachment member. The attachment assembly also includes a plurality of fasteners extending through the first attachment member and the second attachment member such that the plurality of fasteners are loaded in shear during a wing loading condition.

In another aspect, an attachment assembly for attaching an aircraft body to a wing box of an aircraft is provided. The attachment assembly includes a first attachment member coupled to the aircraft body and including an engagement member. The attachment assembly also includes a second attachment member coupled to the wing box and including an extension tab extending away from the wing box, wherein the extension tab is configured to couple to the engagement member. The attachment assembly also includes a plurality of fasteners configured to extend through the extension tab and the engagement member such that the plurality of fasteners are loaded in shear during a wing loading condition.

In yet another aspect, a method of assembling an aircraft is provided. The method includes forming a wing box and forming an aircraft body configured to be coupled to the wing box. The method also includes coupling a first attachment member to the aircraft body and coupling a second attachment member to the wing box. The wing box and the aircraft body are then aligned for fixed attachment and the first attachment member and the second attachment member are coupled together with a plurality of fasteners such that the plurality of fasteners are loaded in shear during a wing loading condition.

The features, functions, and advantages that have been discussed can be achieved independently in various embodiments of the present disclosure or may be combined in yet other embodiments, further details of which can be seen with reference to the following description and drawings.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

The implementations described herein relate to aircraft structures and, more particularly, to aircraft wing-to-body attachments. More specifically, in the exemplary implementation, the aircraft body and the wing box are coupled together using an attachment assembly. A first attachment member of the attachment assembly is connected to the aircraft body and a second attachment member of the attachment assembly is connected to the wing box. A plurality of fasteners couple the first and second attachment assemblies together. Specifically, the fasteners are inserted through the first and second attachment members in a direction parallel to the longitudinal axis of the aircraft body. The attachment assembly also includes a bearing plate coupled to an end surface of the second attachment member in a gap between the first attachment member and the second attachment member. When the aircraft is under a wing loading condition, a lift load is transferred from the wing box to the aircraft body through the attachment assembly. The lift load acts in a direction such that the fasteners are loaded in shear, due to their longitudinal orientation. Further, the lift load causes a compression force in the bearing plate that reduces the overall shear load in the fasteners. Due to the high shear strength of the fasteners and the reduction in shear load, the attachment assembly includes fasteners that are smaller and lighter to reduce the weight of the attachment assembly and also simplify aircraft manufacturing.

Figure 1:
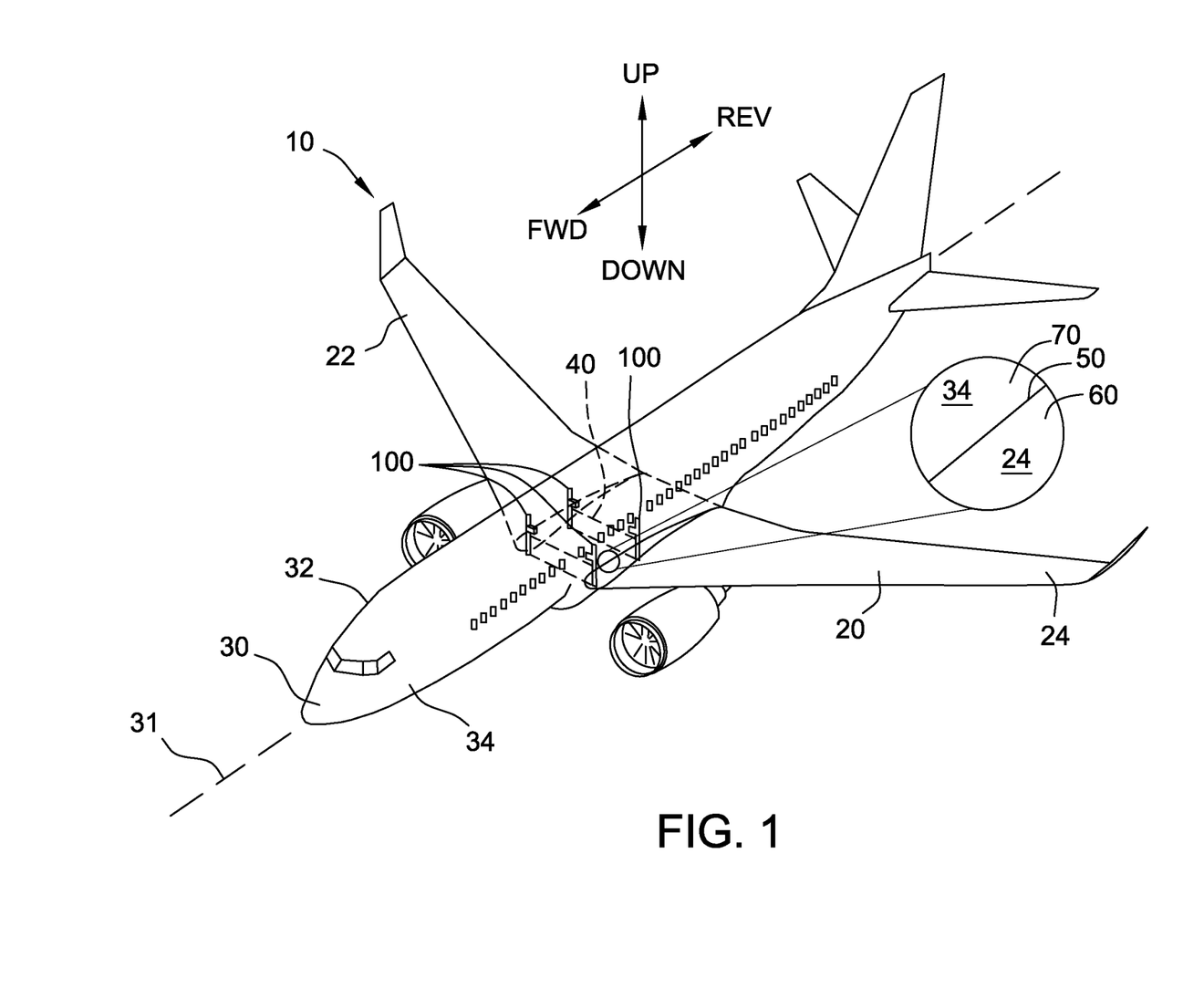
FIG. 1 is a top isometric view of an aircraft having a wing member joined to an aircraft body in accordance with an embodiment disclosed herein.

FIG. 1 is a top isometric view of an aircraft 10 having a wing assembly 20 attached to a fuselage or aircraft body 30 in accordance with an embodiment presented herein. The aircraft body 30 includes a longitudinal axis 31, a first aircraft body member 32, and a corresponding second aircraft body member 34. The wing assembly 20 includes a first wing assembly member 22 extending outwardly from the first aircraft body member 32, and a second wing assembly member 24 extending outwardly from the second aircraft body member 34. The wing assembly 20 further includes a wing box 40 extending through the aircraft body 30. The wing box 40 structurally attaches the first wing assembly member 22 to the second wing assembly member 24. In one embodiment, wing assembly members 22 and 24 are joined together with the wing box 40 therebetween to form a complete wing assembly 20. Similarly, aircraft body members 30 and 34 are joined together to form the complete aircraft body 30, which is then attached to the complete wing assembly 20 at an adjoining intersection 50, where an outer wing skin 60 of the wing assembly 20 intersects an outer body skin 70 of the aircraft body 30, as described in further detail herein.

The wing box 40 may be completely located within the wing assembly 20 and may further define an interior cavity structure, (not shown), that may include a fuel cell or any other cavity that may be separate compartmentalized and independent from the aircraft body 30. For example, the interior cavity structure defined by the wing box 40 may be pressure tested independently from aircraft body 30 pressure testing. This allows testing for any pressure leakage before aircraft body 30 is attached to the wing assembly 20.

The embodiments presented herein are novel methods and systems for adjoining the aircraft body 30 to the wing assembly 20 via the wing box 40 by means of attachment assemblies 100 disposed on forward and rearward lateral edges of the wing box 40, proximate where the outer body skin 70 meets the outer wing skin 60.

In the illustrated embodiment, the aircraft 10 is a commercial aircraft. In other embodiments, however, the methods and systems described herein for attaching wings to bodies can be used on other aircraft, includes other commercial and non-commercial aircraft. For example, other transport aircraft having one or more engines mounted to the aircraft body.

Figure 2:
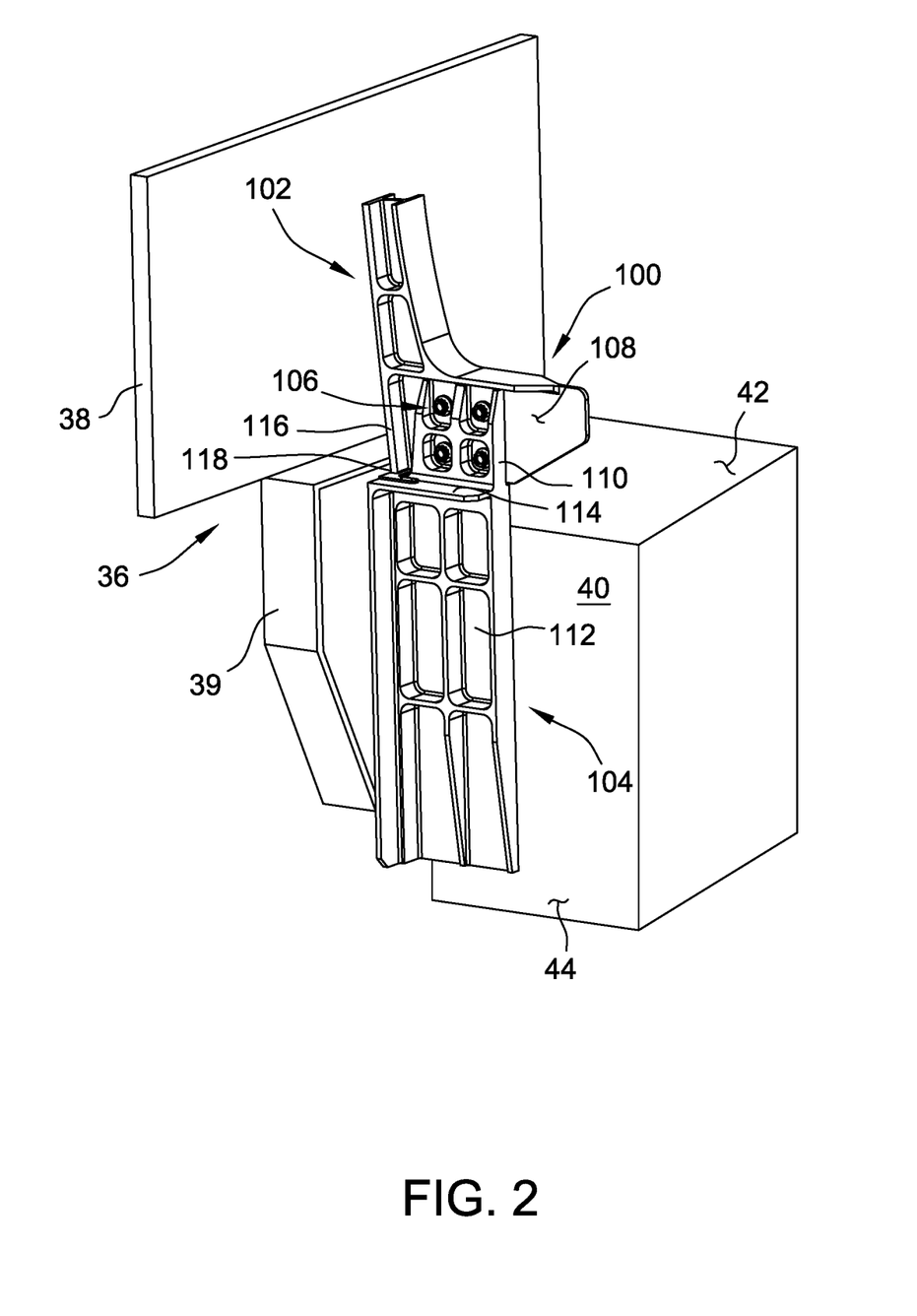
FIG. 2 is a partially cutaway perspective forward or rearward view illustrating a first embodiment of an exemplary attachment assembly joined to a wing box and a fuselage of the aircraft in FIG. 1.
Figure 3:
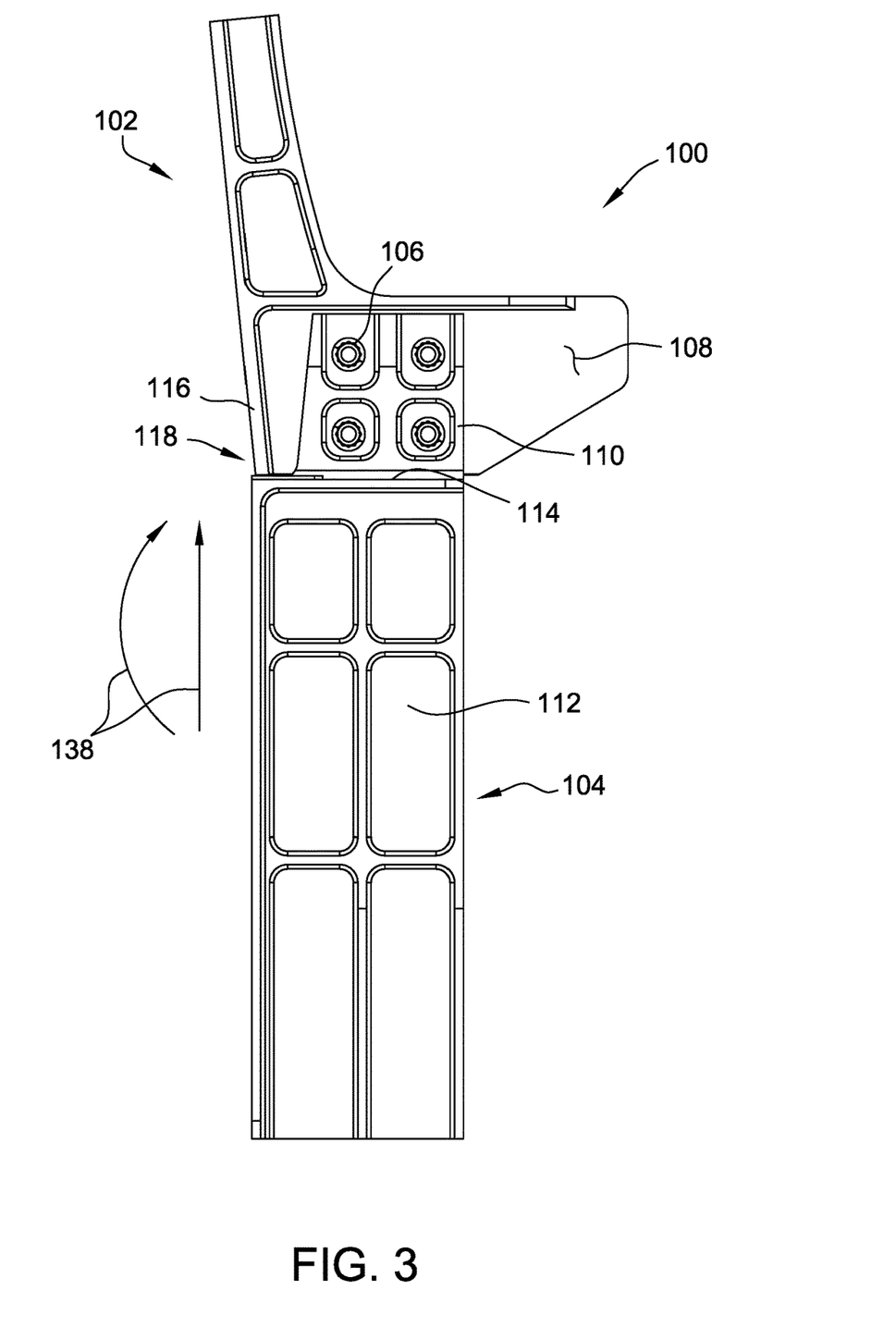
FIG. 3 is a front view of the attachment assembly illustrated in FIG. 2.
Figure 4:
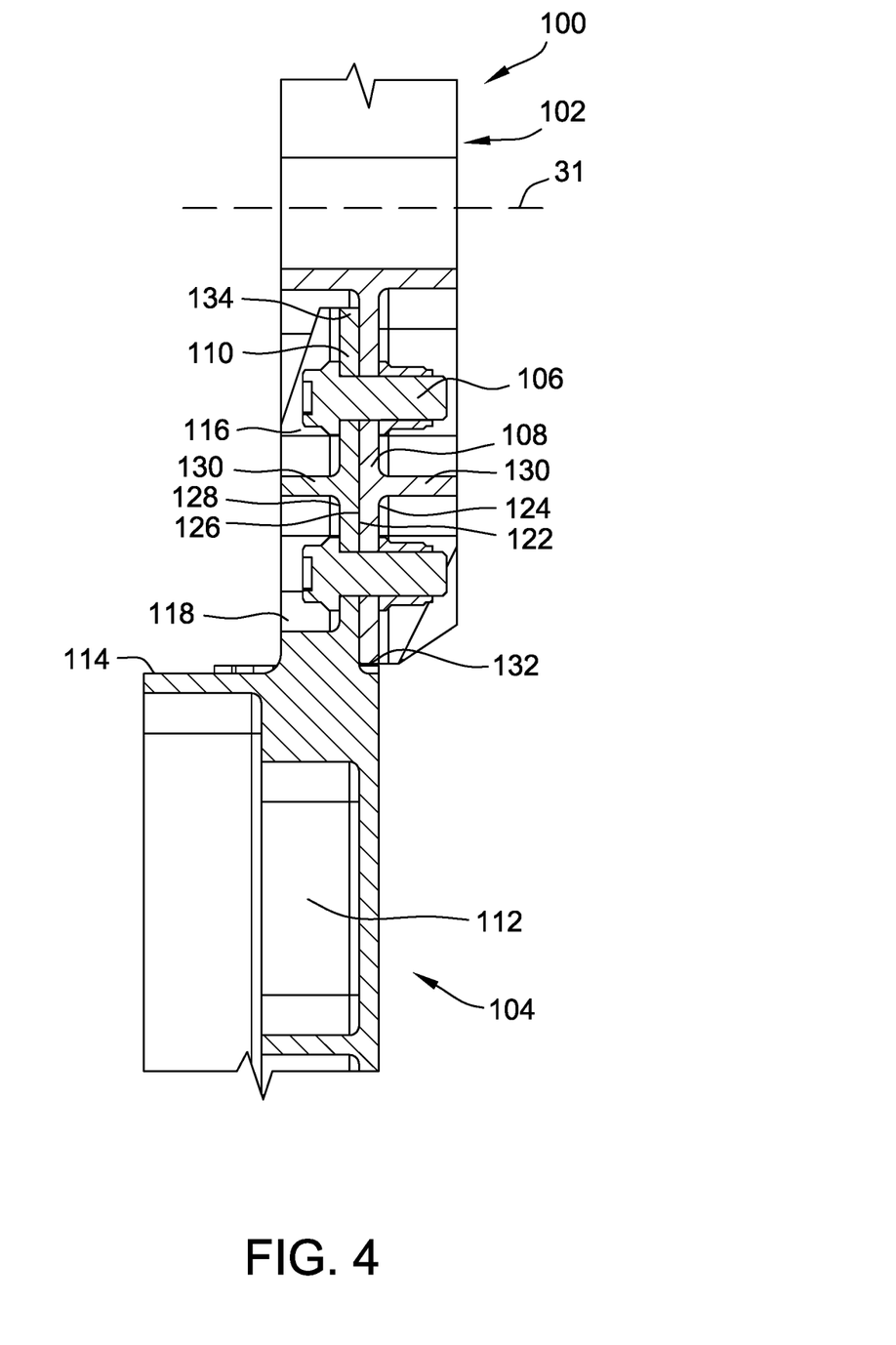
FIG. 4 is a cross-sectional view of the attachment assembly illustrated in FIG. 3.
Figure 5:
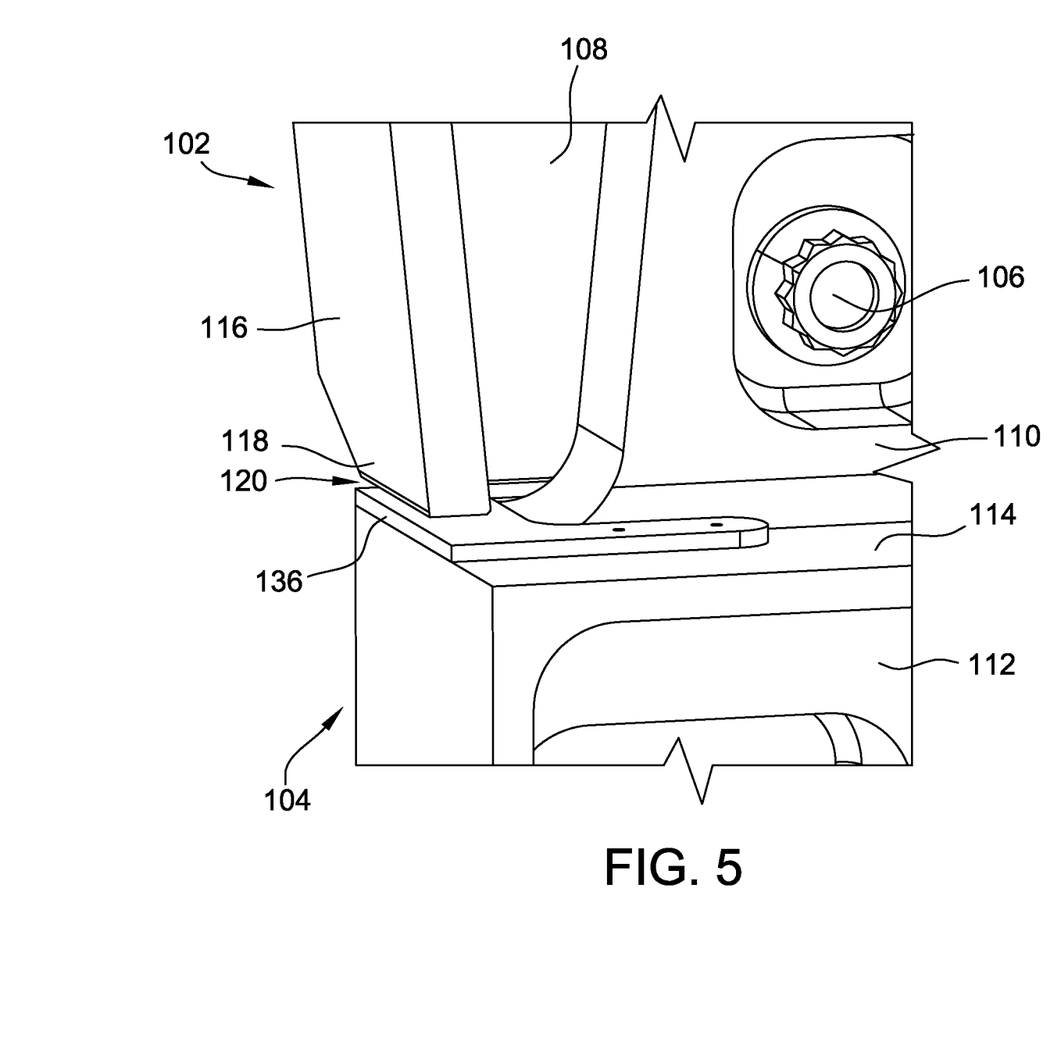
FIG. 5 is perspective view of a bearing plate for use with the illustrated attachment assembly.

FIG. 2 is a partially cutaway perspective forward or rearward view illustrating a first embodiment of an exemplary attachment assembly 100 joined to a wing box 40 and a fuselage or aircraft body 30 of the aircraft 10 in FIG. 1. FIG. 3 is a front view of the attachment assembly 100, FIG. 4 is a cross-sectional view of the attachment assembly 100, and FIG. 5 is perspective view of a bearing plate for use with the illustrated attachment assembly 100.

As shown in FIG. 2, the wing box 40 is partially illustrated to identify an upper surface 42 of the wing box 40 and either a forward facing or rearward facing outer vertical surface 44 of the wing box 40. This orientation is based on whether the attachment assembly 100 is disposed on either the forward facing section of the wing box 40, or on the rearward facing section of the wing box 40, as both are illustrated in FIG. 1. The attachment assembly 100 is additionally located on the outboard member of the wing box 40 to enable fixed attachment to the aircraft body 30 via a fuselage member 36 that may including both a fuselage skin 38 and a trapezoid panel 39. A vertical load on the fuselage member 36 may be reduced when used in conjunction with the trapezoid panel 39. The fuselage skin 38 may also encompass the outboard member of the trapezoid panel 39, (not illustrated).

In the exemplary embodiment, the attachment assembly 100 is coupled to aircraft 30 and to wing box 40 and includes a first attachment member 102 and a second attachment member 104. As shown in FIG. 2, first attachment member 102 is coupled to the aircraft body 30 and second attachment member 104 is coupled to the wing box 40. Additionally, second attachment member 104 is also configured to couple to first attachment member 102 when wing assembly members 22 and 24 and wing box 40 are coupled to aircraft body 30. The attachment assembly 100 also includes a plurality of fasteners 106 extending through the first attachment member 102 and through the second attachment member 104 such that the plurality of fasteners are loaded in shear during a wing loading condition, as described herein.

More specifically, the first attachment member 102 includes an engagement member 108 and the second attachment member 104 includes an extension tab 110 configured to couple to the engagement member 108. In the exemplary embodiment, the plurality of fasteners 106 extend through the extension tab 110 and the engagement member 108 such that the plurality of fasteners 106 are loaded in shear during a wing loading condition.

The second attachment member 104 includes a body portion 112 coupled to the wing box 40 with a plurality of fasteners (not shown). The body portion 112 includes a horizontally-oriented end surface 114. The extension tab 110 extends from the end surface 114 in a direction away from the body portion 112 and the wing box 40.

In one example, as best shown in FIG. 4, the engagement member 108 includes a first engaging surface 122 and a first opposing surface 124. Similarly, the extension tab 110 includes a second engaging surface 126 and a second opposing surface 128. The engaging surfaces 122 and 126 contact each other to facilitate coupling the first attachment member 102 to the second attachment member 104. Additionally, both the first and second opposing surfaces 124 and 128 include stiffeners 130 for increased strength and both the first and second engaging surfaces 122 and 126 are free of the stiffeners 130. Having no stiffeners 130 on the first engaging surface 122 allows for faster and easier assembly of the first attachment member 102 to the second attachment member 104. Also as shown in FIG. 4, a distal end 132 of the engagement member 108 is spaced from the second attachment member 104, and a distal end 134 of the extension tab 110 is spaced from the first attachment member 102. As such, the load path is channeled through the plurality of fasteners 106 rather than through the engagement member 108 and the extension tab 110.

The first attachment member 102 includes an outer flange 116 extending in a forward direction from the engagement member 108. The outer flange 116 includes a distal end 118 configured to be positioned proximate the end surface 114 when the second attachment member 104 is coupled to the first attachment member 102 such that a gap 120 (shown in FIG. 5) is defined between the end surface 114 and the distal end 118. In one example, the attachment assembly 100 includes a bearing plate 136 removably coupled to the end surface 114 and positioned within the gap 120. As shown in FIG. 5, the bearing plate 136 is coupled to the end surface 114 proximate the extension tab 110. As described herein, the distal end 118 of the outer flange 116 of the first attachment member 102 engages the bearing plate 136 during a wing loading condition. When the aircraft is not experiencing a wing loading condition, the distal end 118 of the first attachment member 102 is spaced from the bearing plate 136. Alternatively, the distal end 118 may be only just contacting the bearing plate 136 when the aircraft is not experiencing a wing loading condition.

The bearing plate 136 bears the force of the outer flange 116 during a wing loading condition to protect the second attachment member 104 from repeated wear. Because the bearing plate 136 is removable, it can be replaced when it has reached the end of the serviceable lifetime. Additionally, in one example, the bearing plate 136 is manufactured according to custom measurements for each attachment assembly 100. Due to manufacturing and assembly tolerances, each gap 120 of the four attachment assemblies may be slightly different. Once the first attachment member 102 is secured to the second attachment member 104, the gap 120 is measured, and the bearing plate 136 is machined custom to each attachment assembly on the aircraft 10.

In operation, the wing assembly 20 carries the majority of the forces through the aircraft body 30 via the attachment assembly 100. A first loading condition is present when the aircraft 10 is on the ground, having no lift component on the wing assembly 20, where the attachment members 102 and 104 bear the weight of the aircraft body 30 and transfer it through the wing assembly 20 to main landing gears (not illustrated). Once the aircraft 10 takes off from the ground, a second loading condition is present where the attachment assembly 100 transfer a lift load 138 induced by the in-flight wing assembly 20 to the aircraft body 30 via the attachment members 102 and 104. In such a second loading configuration, the lift load 138 includes significant compression loads and moments due to wing bending that are transferred from the wing assembly members 22 and 24, into the first attachment members 102, through the fasteners 106, into the second attachment members 104, and into the aircraft body 30. The lift load 138 causes bending or rotation of the first attachment member 102 with respect to the second attachment member 104 such that the distal end 118 of the outer flange 116 is pressed into the bearing plate 136. As the lift load 138 acts on the attachment assembly 100, the fasteners 106 are loaded in shear. More specifically, because the fasteners 106 are oriented substantially parallel to the longitudinal axis 31 of the aircraft body 30, the fasteners 106 are loaded in shear during the wing loading condition, or second loading condition. The lift load 138 causes a compression force in the bearing plate 136 that reduces the overall shear load in the fasteners 106. As such, because of the reduction in shear load, the attachment assembly 100 uses fasteners 106 that are smaller and lighter than would typically be used in similar configurations. The smaller and lighter fasteners 106 reduce the weight of the attachment assembly 100 and also simplify manufacturing.

Figure 6:
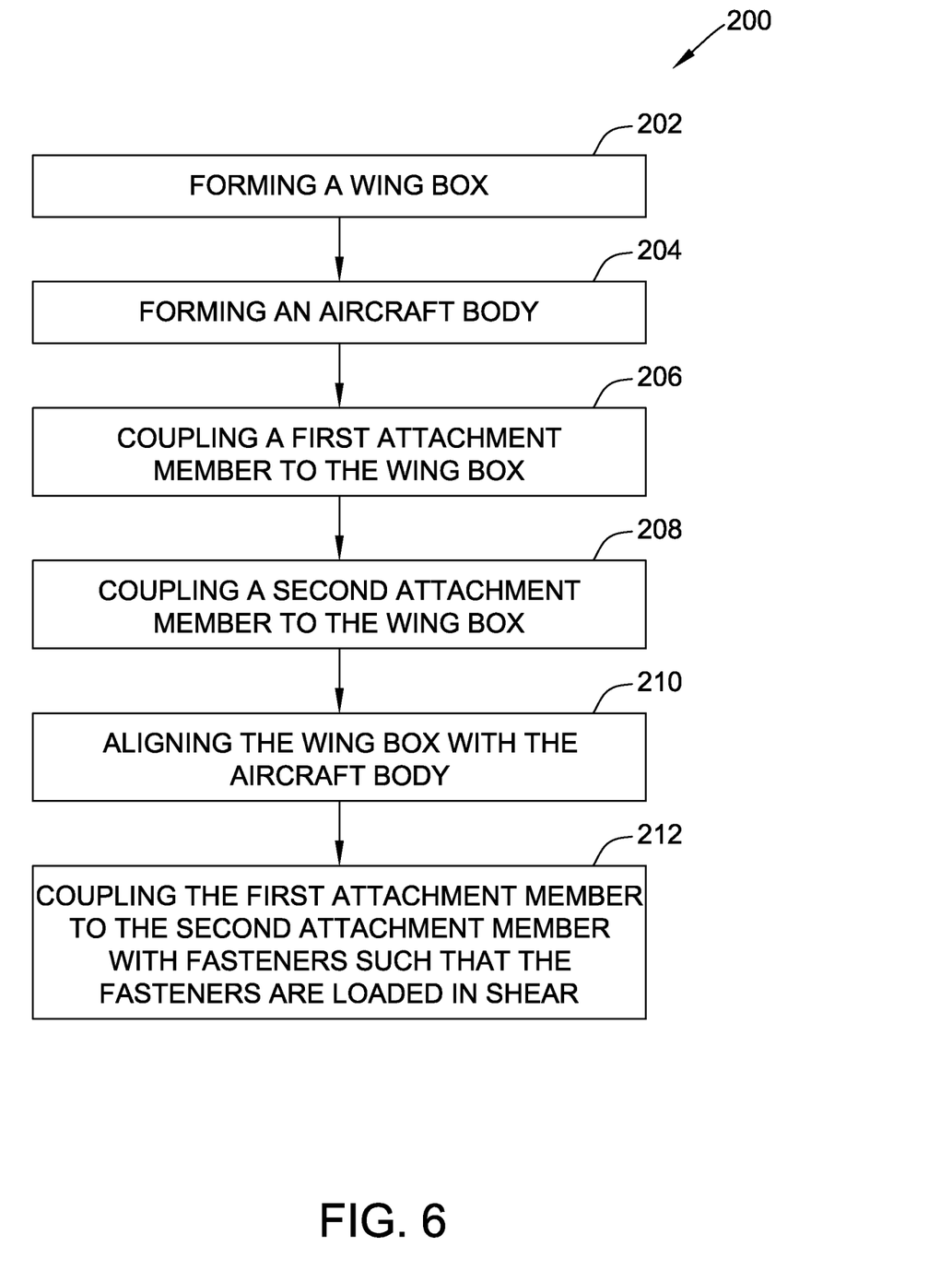
FIG. 6 is a flowchart process illustrating a method of assembling an aircraft.

FIG. 6 is a flowchart process illustrating a method 200 of assembling an aircraft, such as aircraft 10. In the exemplary embodiment, the method 200 includes forming 202 the wing box 40 and forming 204 the aircraft body 30 that is configured to be coupled to the wing box 40. Forming 202 the wing box 40 includes forming the wing box 40 together with the wing assembly 20 such that the wing box 40, the first wing assembly member 22, and the second wing assembly member 24 are coupled together in a unit. Furthermore, forming 204 the aircraft body 30 includes forming a notch in the aircraft body 30 that receives the wing box 40 therein.

The method 200 also includes coupling 206 the first attachment member 102 to the aircraft body 30 and coupling 208 the second attachment member 104 to the wing box 40. The method 200 also includes aligning 210 the wing box 40 with the aircraft body 30. Specifically, the wing box 40 is aligned with the notch in the aircraft body 30. As described herein, the first attachment member 102 is coupled to the aircraft body 30 and the second attachment member 104 is coupled to the wing box 40 before the aircraft body 30 is aligned with the wing box 40. Aligning 210 the wing box 40 with the aircraft body 30 also includes aligning the first attachment member 102 with the second attachment member 104 and drilling through holes in the first attachment member 102 and the second attachment member 104 for the plurality of fasteners 106.

The method 200 further includes coupling 212 the first attachment member 102 to the second attachment member 104 with the plurality of fasteners 106 such that the plurality of fasteners 106 are loaded in shear during a wing loading condition. Specifically, coupling 212 the first attachment member 102 to the second attachment member 104 includes coupling the engagement member 108 of the first attachment member 102 to the extension tab 110 of the second attachment member 104. Furthermore, coupling 212 the engagement member 108 to the extension tab 110 includes inserting the plurality of fasteners 106 into the new or pre-drilled through holes in a direction substantially parallel to the longitudinal axis of the aircraft body 30. In the exemplary embodiment, coupling 212 the first attachment member 102 to the second attachment member 104 includes coupling the first attachment member 102 to the second attachment member 104 such that a distal end 118 of the outer flange 116 of the first attachment member 102 is spaced from a horizontally-oriented end surface 114 of the second attachment member 104 to define the gap 120 therebetween. In one implementation, the method 200 also includes coupling the bearing plate 136 to the end surface 114 and within the gap 120 such that the bearing plate 136 is configured to engage the distal end 118 of the outer flange 116 during the wing loading condition.

As described herein, the wing assembly 20 carries the majority of the forces through the aircraft body 30 via the attachment assembly 100. The aircraft 10 is under the first loading condition when the aircraft 10 is on the ground and there is no lift component on the wing assembly 20. In this first loading condition, the attachment members 102 and 104 bear the weight of the aircraft body 30 and transfer it through the wing assembly 20 to main landing gears (not illustrated). Once the aircraft 10 takes off from the ground, the second loading condition is present where the attachment assembly 100 transfers the lift load 138 induced by the in-flight wing assembly 20 to the aircraft body 30 via the attachment members 102 and 104. In such a second loading configuration, also known identified herein as a wing loading condition, the lift load 138 includes significant compression loads and moments due to wing bending that are transferred from the wing assembly members 22 and 24, into the first attachment members 102, through the fasteners 106, into the second attachment members 104, and into the aircraft body 30. As the lift load 138 acts on the attachment assembly 100, a compression force is transferred into the bearing plate 136 and the fasteners 106 are loaded in shear. Due to the compression load, the shear load experienced by the fasteners 106 is reduced. As such, the fasteners 106 are smaller and lighter than fasteners used in previous wing box to aircraft body configurations.

The implementations described herein relate to aircraft structures and, more particularly, to aircraft wing-to-body attachments. More specifically, in the exemplary implementation, the aircraft body and the wing box are coupled together using an attachment assembly. A first attachment member of the attachment assembly is connected to the aircraft body and a second attachment member of the attachment assembly is connected to the wing box. A plurality of fasteners couple the first and second attachment assemblies together. Specifically, the fasteners are inserted through the first and second attachment members in a direction parallel to the longitudinal axis of the aircraft body. The attachment assembly also includes a bearing plate coupled to an end surface of the second attachment member in a gap between the first attachment member and the second attachment member. When the aircraft is under a wing loading condition, a lift load is transferred from the wing box to the aircraft body through the attachment assembly. The lift load acts in a direction such that the fasteners are loaded in shear, due to their longitudinal orientation. Further, the lift load causes a compression force in the bearing plate that reduces the overall shear load in the fasteners. Due to the high shear strength of the fasteners and the reduction in shear load, the attachment assembly includes fasteners that reduce the weight of the attachment assembly and also simplify aircraft manufacturing.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft comprising:
   an aircraft body including a longitudinal axis;
   a wing box extending through the aircraft body; and
   an attachment assembly coupled to said aircraft body and to said wing box, said attachment assembly comprising:
      a first attachment member coupled to the aircraft body, wherein said first attachment member comprises an outer flange having a distal end;
      a second attachment member coupled to said wing box, wherein said second attachment member is configured to couple to said first attachment member, wherein said second attachment member comprises a horizontally-oriented end surface spaced from said distal end to define a gap therebetween when said first attachment member is coupled to said second attachment member;
      a bearing plate removably coupled to said horizontally-oriented end surface and positioned within said gap; and
      a plurality of fasteners extending through said first attachment member and said second attachment member such that said plurality of fasteners are loaded in shear during a wing loading condition.

2. The aircraft of claim 1, wherein said plurality of fasteners are oriented substantially parallel to the longitudinal axis of said aircraft body.

3. The aircraft of claim 1, wherein the engagement member and the extension tab are both oriented substantially perpendicular to a longitudinal axis of the aircraft body.

4. The aircraft of claim 1, wherein said first attachment member comprises an engagement member and wherein said second attachment member comprises an extension tab configured to couple to said engagement member.

5. The aircraft of claim 4, wherein said outer flange extends from said engagement member.

6. The aircraft of claim 4, wherein said plurality of fasteners extends through said engagement member and said extension tab.

7. The aircraft of claim 6, wherein said extension tab extends away from said wing box.

8. The aircraft of claim 1, wherein said first attachment member is configured to engage said bearing plate during a wing loading condition, and wherein said first attachment member is configured to be spaced from said bearing plate when the aircraft is not experiencing the wing loading condition.

9. The aircraft of claim 8, wherein said bearing plate is coupled to said second attachment member proximate said extension tab and is configured to engage said first attachment member during the wing loading condition.

10. An attachment assembly for attaching an aircraft body to a wing box of an aircraft, the attachment assembly comprising:
    a first attachment member configured to be coupled to the aircraft body and comprising an engagement member, wherein said first attachment member comprises an outer flange having a distal end;
    a second attachment member configured to be coupled to the wing box and comprising an extension tab extending away from said wing box, wherein said extension tab is configured to couple to said engagement member, wherein said second attachment member comprises a body portion having a horizontally-oriented end surface spaced from said distal end to define a gap therebetween when said first attachment member is coupled to said second attachment member;
    a bearing plate removably coupled to said horizontally-oriented end surface and positioned within said gap; and
    a plurality of fasteners configured to extend through said extension tab and said engagement member such that said plurality of fasteners are loaded in shear during a wing loading condition.

11. The attachment assembly of claim 10, wherein said first attachment member is configured to engage said bearing plate during a wing loading condition, and wherein said first attachment member is configured to be spaced from said bearing plate when the aircraft is not experiencing the wing loading condition.

12. The attachment assembly of claim 10, wherein said bearing plate is coupled to said second attachment member proximate said extension tab and is configured to engage said first attachment member during the wing loading condition.

13. The attachment assembly of claim 10, wherein said plurality of fasteners are oriented substantially parallel to a longitudinal axis of the aircraft body.

14. The attachment assembly of claim 10, wherein said extension tab extends away from said wing box.

15. The attachment assembly of claim 10, wherein said extension tab extends from said horizontally-oriented end surface in a direction away from said body portion.

16. The attachment assembly of claim 15, wherein said outer flange extends from said engagement member.

17. A method of assembling an aircraft, the method comprising:
    forming a wing box;
    forming an aircraft body configured to be coupled to the wing box;
    coupling a first attachment member to the aircraft body, wherein the first attachment member includes an outer flange having a distal end;
    coupling a second attachment member to the wing box, wherein the second attachment member includes a horizontally-oriented end surface;
    aligning the wing box with the aircraft body for fixed attachment;

coupling the first attachment member to the second attachment member with a plurality of fasteners such that the plurality of fasteners are loaded in shear during a wing loading condition and such that the distal end of the outer flange is spaced from the end surface to define a gap therebetween; and coupling a bearing plate to the end surface and within the gap such that the bearing plate is configured to engage the distal end of the outer flange during the wing loading condition.

18. The method of claim 17, wherein coupling the first attachment member of the second attachment member comprises coupling an engagement member of the first attachment member to an extension tab of the second attachment member, wherein the extension tab extends away from the wing box.

19. The method of claim 18, wherein coupling the engagement member to the extension tab comprises inserting the fasteners in a direction substantially parallel to a longitudinal axis of the aircraft body.

20. The method of claim 18, wherein coupling the engagement member to the extension tab comprises coupling the engagement member to the extension tab such that the engagement member and the extension tab are both oriented substantially perpendicular to a longitudinal axis of the aircraft body.

* * * * *